United States Patent
Subisak (10) Patent No.: US 6,974,235 B2
(45) Date of Patent: Dec. 13, 2005

(54) PRISMATIC STRUCTURES HAVING SHAPED SURFACES

(75) Inventor: Gregory J. Subisak, Gahanna, OH (US)

(73) Assignee: Acuity Brands, Inc., Atlanta, GA (US)

( * ) Notice: Subject to any disclaimer, the term of this patent is extended or adjusted under 35 U.S.C. 154(b) by 27 days.

(21) Appl. No.: 10/280,279

(22) Filed: Oct. 25, 2002

(65) Prior Publication Data
US 2004/0080948 A1    Apr. 29, 2004

(51) Int. Cl.$^7$ ............................................. F21V 5/00
(52) U.S. Cl. ..................... 362/326; 362/307; 362/340; 362/558
(58) Field of Search ................ 362/326–328, 362/340, 307–309, 558, 31, 472, 339, 26, 362/27, 334, 335, 337, 338

(56) References Cited

U.S. PATENT DOCUMENTS

| | | | | |
|---|---|---|---|---|
| 3,395,273 A | * | 7/1968 | Welty | 362/334 |
| 4,104,615 A | * | 8/1978 | Hunter | 340/472 |
| 4,118,763 A | * | 10/1978 | Osteen | 362/339 |
| 4,262,326 A | * | 4/1981 | Lewin | 362/223 |
| 4,719,548 A | * | 1/1988 | Orosz | 362/309 |
| 5,467,208 A | * | 11/1995 | Kokawa et al. | 349/67 |
| 6,256,447 B1 | * | 7/2001 | Laine | 385/146 |
| 2002/0135996 A1 | * | 9/2002 | Suga | 362/31 |
| 2002/0163790 A1 | * | 11/2002 | Yamashita et al. | 362/31 |

* cited by examiner

*Primary Examiner*—John Anthony Ward
*Assistant Examiner*—Mark Tsidulko
(74) *Attorney, Agent, or Firm*—Kenneth E. Darnell (57) ABSTRACT

Prismatic structures having at least certain conventionally linear surfaces thereof configured in a non-linear fashion to control the direction of light exiting said structures, the invention functions to reduce light losses in a luminaire or the like while facilitating the emanation of light from the luminaire at an acceptable viewing angle and with a reduction in glare. Prisms, particularly splitter prisms, configured according to the invention are formed with at least portions of conventionally linear surfaces as arcuate, curvilinear or generally curving segmented surfaces so as to direct light out of the luminaire for useful illumination rather than in a wasteful direction back into the luminaire. Prisms configured according to several embodiments of the invention function to increase light efficiencies either upwardly or downwardly depending on illumination requirements.

42 Claims, 10 Drawing Sheets

PRISMATIC STRUCTURES HAVING SHAPED SURFACES

BACKGROUND OF THE INVENTION

1. Field of the Invention

The invention relates generally to prismatic structures configured to maximize light control and particularly to splitting prisms having conventionally non-linear surfaces capable of directing light incident thereon away from impingement on adjacent prisms and therefore out of a light-transmissive luminaire body or the like such that the directed light is available for illumination.

2. Description of the Prior Art

Prismatic structures, or prisms, have been known for centuries to be useful in a variety of applications including incorporation into light transmissive "globes" and the like for use in luminaires of varying description. U.S. Pat. No. 563,836 issued in 1896 to Blondel et al discloses "globes, shades, reflectors, and other envelops" useful in luminaires and having prisms molded or otherwise formed on such globes for the purpose of reflecting, refracting and directing light rays in a desired manner. For purposes of background and elucidation of the scope and nature of the present invention, U.S. Pat. No. 563,836 is incorporated hereinto by reference. It is to be understood that literally thousands of issued United States patents and literally millions of light transmissive objects manufactured by mankind have existed and exist, many of these objects having prisms of varying character incorporated thereinto, Franck, in U.S. Pat. Nos. 2,818,500 and 2,887,568 discloses prisms generally useful in luminaire structures. Franck describes a variety of prisms, flutes and light-directing structures typically formed of glass and intended to efficiently illuminate areas in the vicinity of such luminaires. In U.S. Pat. No. 2,887,568, splitting prisms are mentioned as being useful for light direction in the illumination of an elongated environmental space such as a hallway. In U.S. Pat. No. 2,818,500, Franck describes the shaping of portions of prisms at apices and at valleys between adjacent prisms for reduction of light loss. Barnes et al, in U.S. Pat. Nos. 4,839,781 and 5,444,606, generally describe the use of prisms in globes used in luminaires and particularly in globes formed of "plastic" materials such as acrylic materials, these materials having come in more recent times to be used along with "glass" materials of varying description for the formation of globes used in luminaires. In U.S. Pat. No. 4,839,781, Barnes et al disclose a luminaire globe having differing kinds of prisms formed in differing zones to reflect and/or refract light for selective variation of light distribution depending on location of a light source within the luminaire. Barnes et al particularly describe vertical prisms of refractive or reflective characteristics, or both, as being useful in luminaire structures such as are disclosed with the choice of such prisms being dependent upon the location of a light source within a luminaire so configured.

Osteen, in U.S. Pat. Nos. 4,118,763 and 5,036,445, respectively describes globe members used within a luminaire and disposed about a light source, such globe members being constructed of light transmissive material having a variety of prismatic surfaces formed thereon which act in combination and in confluence with the shape of the globe member to produce light output in desirable directions. In U.S. Pat. No. 5,036,445, Osteen discloses a reflector structure having prisms capable of total internal reflection so that light exiting from the top of a globe member can be limited. Pearce, in U.S. Pat. No. 5,416,684, discloses the use of prisms formed on differing portions of a globe member for accomplishing desired light direction such as for increasing downward output of light from a luminaire. In U.S. Pat. No. 3,329,812, Harling discloses a particular refractor structure useful in a luminaire for light control through direction of light emanating from a light source to illuminate locations externally of the luminaire. Fouke, in U.S. Pat. No. 6,027,231, inter alia, describes globe members particularly useful in luminaires and formed of glass, acrylic materials and the like, for direction of light from a luminaire for efficient illumination. Kelly et al, in U.S. Pat. No. 5,434,765, describe a globe member having reflector and refractor sections and having prisms formed on surfaces of said sections for direction of light in a downward manner.

The United States patents mentioned above are only representative of a very substantial body of art that encompasses light transmissive reflector/refractor structures used in luminaires or the like wherein light output from a luminaire is controlled for direction into desired locations in the vicinity of such luminaires. Globe members used in such luminaires are light-transmissive members exhibiting either refractive, reflective or a combination of refractive and reflective properties, these properties occurring by virtue of the nature of prismatic and similar structures incorporated into such globe members. In this general area of lighting technology, light from a luminaire may be intended to directed upwardly, downwardly or both from a luminaire with the preponderance of light emanating from such a luminaire being intended as "uplight" or as "downlight". Judicious selection of prismatic structures incorporated into such luminaire globe members permits light control and direction of light in a desired manner as has long been understood in the art.

Need often arises in the illumination arts for directing light into space located about a luminaire at an acceptable viewing angle with a minimum of glare. Various products manufactured and marketed by Acuity Brands, Inc. of Atlanta, Ga., formerly Holophane Corporation, under the trademark PRISMGLO utilize a particular kind of prism known as a splitter prism or splitting prism such as is shown in FIG. 5 of U.S. Pat. No. 563,836 to Blondel et al as referred to above. In the PRISMGLO luminaires, splitter prisms are used in order to take advantage of both total internal reflection and refraction to control light direction. Splitter prisms such as are used on PRISMGLO luminaires utilize linear or "straight line" sides or "flat" prismatic surfaces. Luminaire globe members of certain configurations with which splitter prisms can advantageously be employed have been found to be subject to light losses when splitter prisms having linear or straight sides or flat surfaces are utilized. Accordingly, the present invention intends the configuration of a splitter prism in particular that accomplishes light redirection more efficiently than is possible with splitter prisms configured according to the prior art. Prior art splitter prisms disposed on luminaire globe, members of certain shapes and with light incident thereon at certain angles of incidence unavoidably function to direct light onto an immediately adjacent prism. Light rays incident on the immediately adjacent prisms in such situations are redirected into the interior of the luminaire globe member or in some other direction such that the light is lost and the efficiency of the luminaire is thereby reduced. Splitter prisms configured according to the present invention and particularly functioning within particular environments as disclosed herein are formed so that light incident thereon is redirected in a manner so as to avoid incidence on immediately adjacent prisms, thereby allowing more light to enter a space being illuminated and thereby causing the luminaire to be more efficient. It is to be understood that the concept embodied by the several embodiments of the present invention can be applied to prisms of differing kind and not only to prisms such as could be referred to as "splitter prisms" or the like.

SUMMARY OF THE INVENTION

The invention provides in several embodiments prismatic structures or prisms having at least certain surfaces configured in a curvilinear manner in order to better control light incident on said surfaces. The prismatic structures of the invention are of varying kind and character and can be configured according to the teachings of the invention. In preferred embodiments, however, prisms typically referred to as splitter prisms or splitting prisms formed particularly in refractor portions of luminaires can be configured according to the teachings of the invention in order to increase the efficiency of such luminaires. A prism, such as a splitter prism, is conventionally configured with linear "sides" or surfaces that appear to be linear when such a prism is viewed in section. Typically, splitter prisms have been used in luminaire structures as at least a portion of the prisms provided on a refractor section for refracting light both upwardly and downwardly, such prisms functioning both by total internal reflection and refraction to control light direction. Globe members of conventional luminaires can be shaped in a manner such that immediately adjacent prisms of "straight-sided" splitter prisms can intercept light exiting one of said splitter prisms and redirect light other than as is intended such as back into the luminaire globe member. Light can therefore be lost and luminaire efficiency reduced. It should be understood that those light rays misdirected in this manner are typically those rays incident on the straight side or flat surface of such a prism near a "valley" where adjacent prisms meet. Those light rays incident more toward the apex of a given prism would typically not be redirected to be incident on an adjacent prism but would be redirected outwardly of the luminaire to provide appropriate and desired illumination, According to the invention, at least one straight side or flat surface of a prism, such as a splitter prism, can be formed in a curvilinear manner so that light rays incident thereon from interiorly of a luminaire globe member or the like is redirected in a manner such that an immediately adjacent prism does not intercept the light ray and direct said ray either back into the luminaire globe member or in an undesired direction. The invention contemplates prism surfaces formed inter alia in a non-linear manner such as in a curved manner, in a partially curved manner or in a series of straight segments having a generally arcuate character. In essence, a prism surface configured according to the invention is at least partially curved and particularly over that portion thereof in proximity to an anterior portion of the prism as opposed to a distal portion or apex of said prism. Prisms configured according to the invention are preferably utilized as refracting prisms although prisms having reflecting capabilities or both refracting and reflecting capabilities can also be configured according to the invention. It is also to be understood that prisms configured according to the invention can have both "sides" or "surfaces" configured according to the invention, that is, either "upper" or "lower" surfaces so configured depending upon the direction in which light is to be directed. Essentially, linear sides or flat surfaces of conventional prisms are configured according to the invention to at least have a portion of otherwise conventionally linear sides or flat surfaces formed in a non-linear fashion in order to produce the advantages accruing to a practice of the invention.

It is further to be understood that prisms configured according to the invention can be provided on a refractor section of a luminaire globe member with a cooperating reflector section being capable of formation from materials that differ from the material used to form said refractor section. In particular, a reflector section of a luminaire globe member could be formed of metal, glass, plastic materials such as acrylic, etc. while the refractor sections on which prisms configured according to the invention are incorporated can be formed of light transmissive materials such as glass, acrylic, etc. It is also to be understood that prisms configured according to the invention can be used to refractively redirect high angle lamp light into useful downwardly directed rays, upwardly directed rays or both in order to increase the percentage of light directed from a luminaire globe member, thereby to reduce light loss and increase lighting performance. Particular lighting applications wherein prisms configured according to the invention can most effectively be used is within an environmental space wherein light directed from a refractor section of a luminaire globe member must be available to a viewer at an acceptable viewing angle with a minimum of glare. The usefulness of prisms configured according to the invention within such use environments depends primarily upon the angle of incidence of light from a light source within a luminaire onto said prisms and particularly coupled with the shape of the luminaire globe member.

It is therefore an object of the invention to provide prismatic structures having shaped surfaces over at least portions of elongated surfaces thereof for the purpose of controlling the direction of light exiting from said prismatic structures.

It is another object of the invention to provide prisms of differing kind having surfaces configured in an arcuate or curvilinear manner at least at portions thereof and especially such portions near anterior ends or edges of said prismatic structures.

It is a further object of the invention to provide luminaire globe members having prisms formed thereon and configured such that normally straight sided or flat-surfaced portions of said prisms are configured at least partially in a non-linear manner such as in a smoothly curvilinear or segmented curvilinear manner so that light is directed from the luminaire globe member for efficient use rather than back into the globe member or in a direction that is wasteful of light.

Further objects and advantages of the invention will become more readily apparent in light of the following detailed description of the preferred embodiments.

DESCRIPTION OF THE PREFERRED EMBODIMENTS

Reference is hereby made to U.S. patent application Ser. No. 10/280,281, entitled "Reflector/Refractor Light Control Luminaire", filed of even date and assigned to the present assignee and also to U.S. patent application Ser. No. 10/280,280, entitled "Luminaire Globe having Low Glare Bandless Seam", filed of even date and assigned to the present assignee, these applications being incorporated hereinto by reference.

Figure 1:
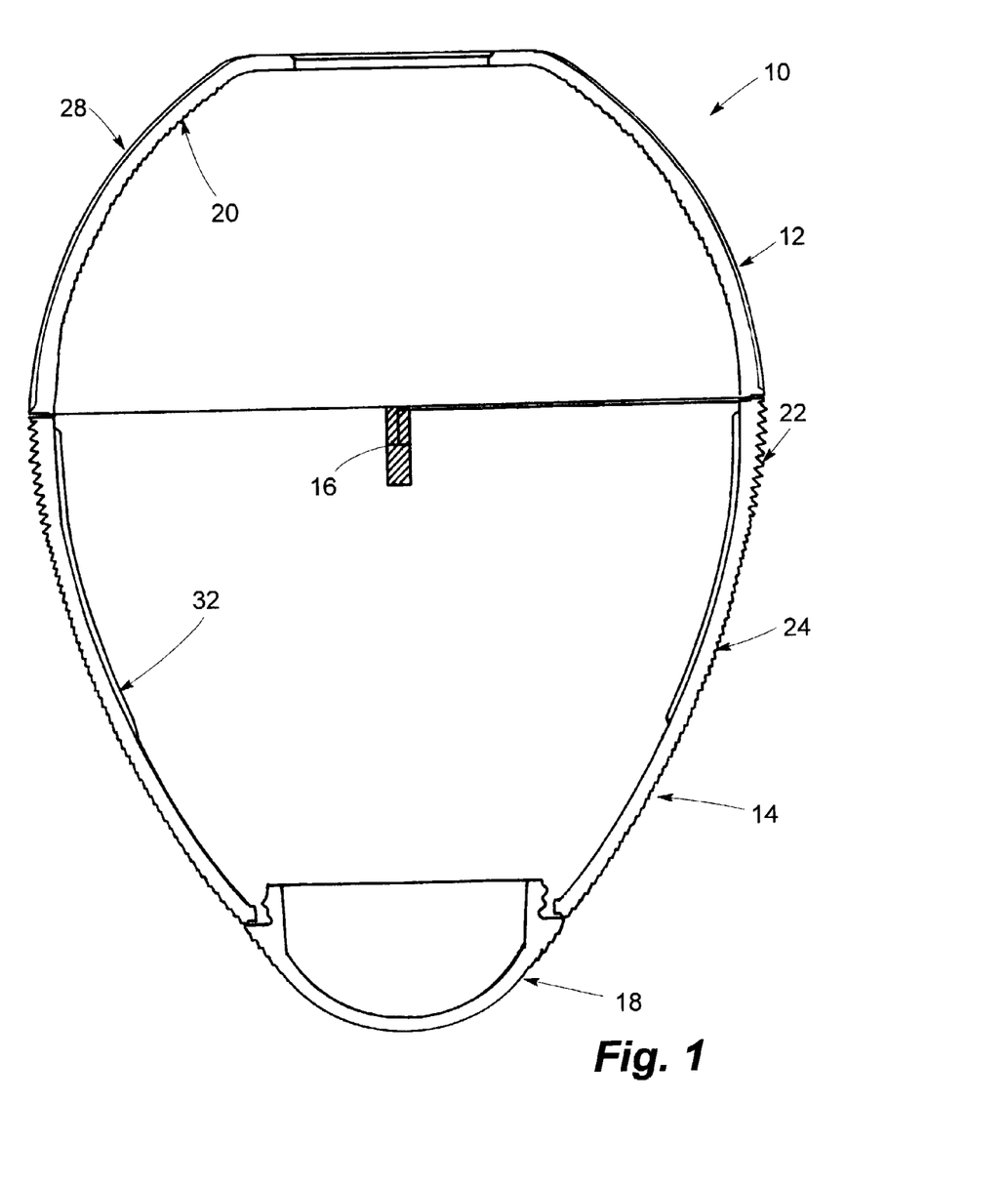
FIG. 1 is a schematic idealized representation of a luminaire globe member having prisms formed thereon and configured according to the invention.

Referring now to the drawings and particularly to FIG. 1, a globe member of a luminaire is shown representationally at 10 to be formed of a separate reflector 12 and refractor 14, a light source being represented at 16 to be located internally of the globe member 10. The globe member 10 is further seen to be provided with a door 18 intended to permit access into the interior of said globe member 10 for purposes of relamping and the like. The globe member 10 is understood to be conventional in the sense that similar structures have long been employed for use in luminaires of varying description including the PRISMGLO products of Acuity Brands, Inc. as referred to hereinabove. In luminaires of this kind, the reflector 12, the refractor 14 and the door 18 are conventionally formed of glass or other light transmissive material such as plastics including acrylics and the like. The light source 16 in such conventional luminaire structures can take essentially any form but typically takes the form of a gaseous discharge lamp such as a high intensity discharge (HID) lamp. The reflector 12 and the refractor 14 are mounted together such as by structure (not shown) and/or through use of bonding material and the like inter alia. The door 18 can be mounted to the refractor 14 in a conventional manner, the door 18 typically having thread-like elements which allow the door 18 to be fitted into positive engagement with the refractor 14. It is further to be understood that the reflector 12 could be formed of a material such as metal or any other material providing the capability of reflecting light from the light source 16 in a desired fashion.

Figure 6:
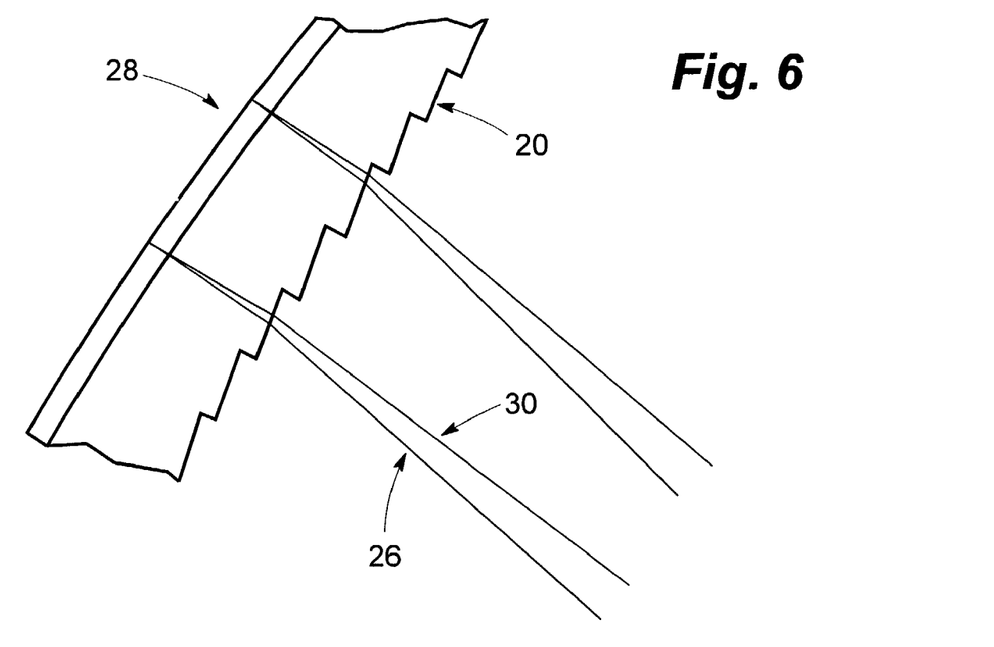
FIG. 6 is a schematic idealized representation illustrating conventional prisms usable on a luminaire globe member in association with prisms configured according to the invention.

When the reflector 12 is configured essentially as shown in FIG. 1, a plurality of refractive prisms 20 are formed on inner surfaces of the reflector 12, the prisms 20 also being shown in FIG. 6 to reflect light incident thereon back into the interior of the globe member 10 and toward any of a plurality of either splitter prisms 22 or refractive prisms 24 formed on the refractor 14. As seen in FIG. 6, an incident ray shown at 26 is refracted by one of the prisms 20 and is then incident on one of a plurality of prisms 28 for reflection back toward one of the prisms 20 whereby reflected ray 30 is then again refracted by the prism 20 and directed toward the refractor 14 for further direction by one of the splitter prisms 22 or one of the refractive prisms 24 on the refractor 14 externally of the refractor 14 for illumination purposes. The structure and function of the prisms 20 and 28 of FIGS. 1 and 6 can be conventional in nature and are described herein for purposes of illustration of a particular environment within which prisms configured according to the invention can be used. It is further to be understood that the prisms 28 are represented as shown since, in the essentially sectional representation of FIGS. 1 and 6, the prisms 28 would be seen in a longitudinal sense rather than in the sense of concentricity as the prisms 20 are seen.

The prisms 24 formed as component portions of the refractor 14 are essentially conventional prisms intended to be refractive in nature. Reference is made to disclosure present in copending U.S. patent application Ser. No. 10/280,281, entitled "Reflector/Refractor light Control Luminaire" referred to hereinabove and incorporated hereinto by reference for a description of preferred refractive structures useable as the prisms 24. Prisms utilized in the environment shown could also have reflective capabilities as well as refractive capabilities as is conventional in the art. It is also to be understood that prismatic structures could optionally be formed on interior walls of the refractor 14 such as is represented at 32 in a conventional manner for conventional functions well known in the art. Light emanating from the light source 16 as well as light directed from the reflector 12 can be incident on the prisms 24 and be redirected externally of the globe member 10 by said prisms 24 in a conventional manner.

Figure 3:
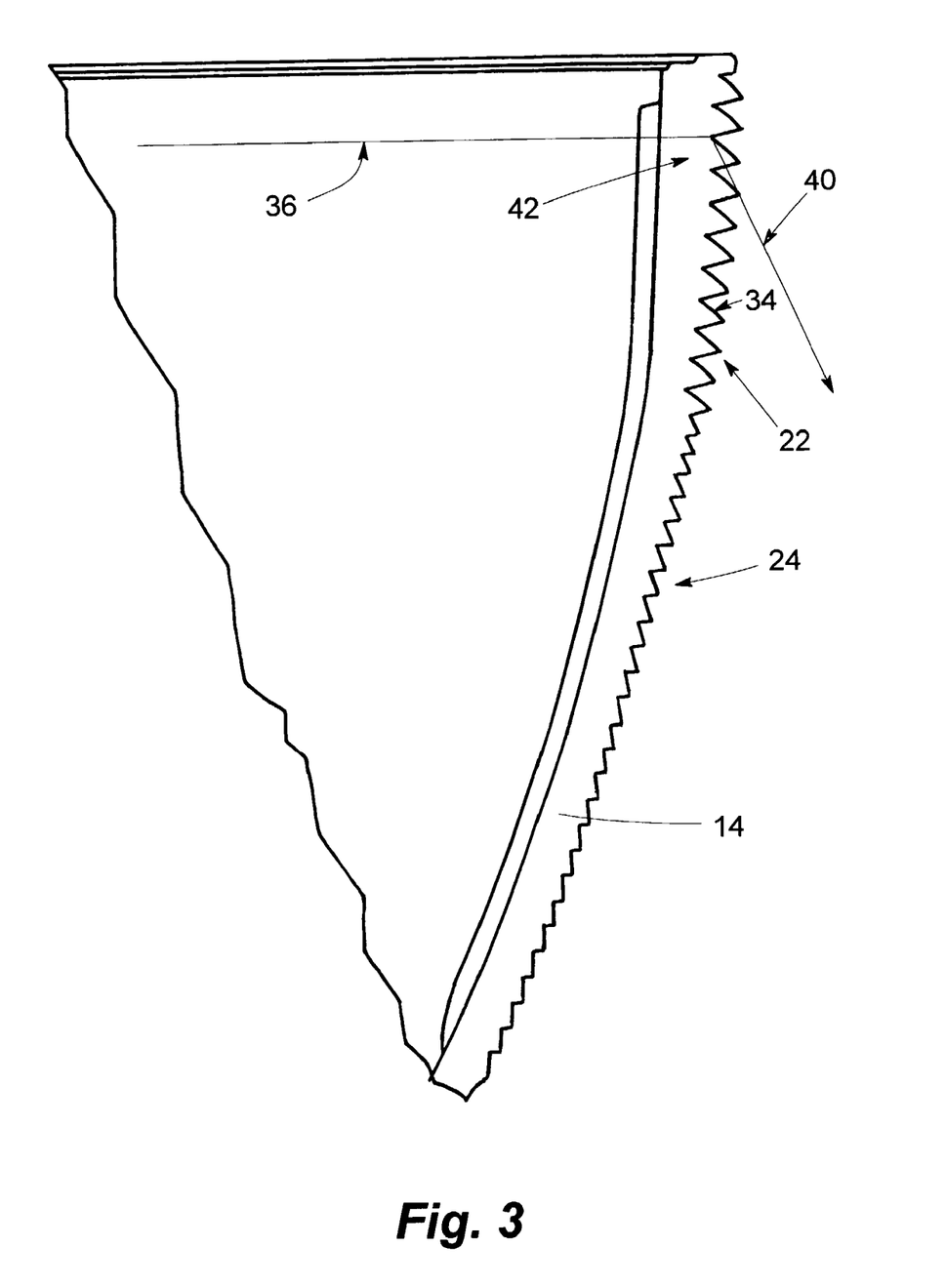
FIG. 3 is a schematic idealized representation of a portion of a luminaire globe member having at least certain prisms formed thereon and configured according to the invention.
Figure 4:
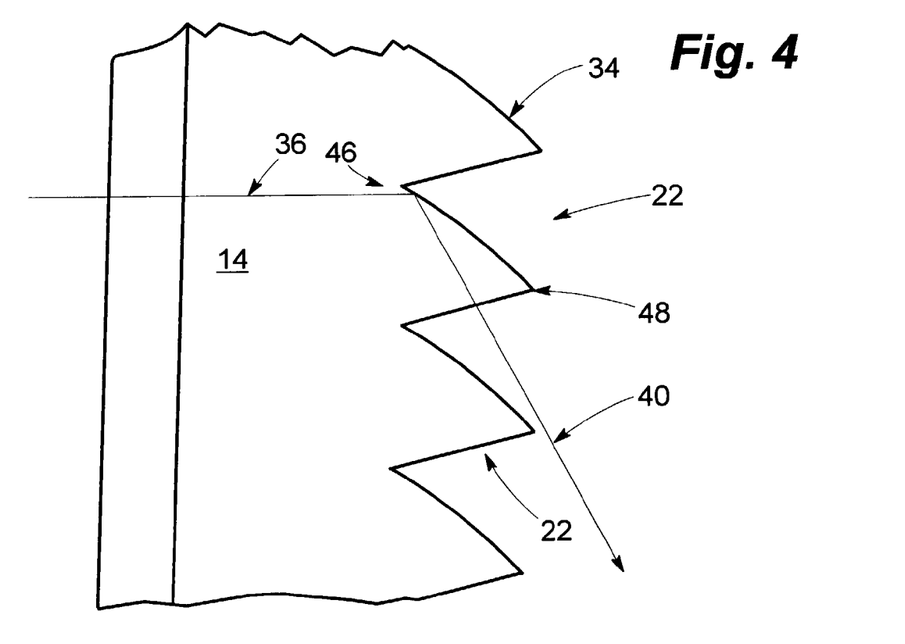
FIG. 4 is a detailed schematic idealized representation of prisms configured according to a first embodiment of the invention.

Given the shape of the refractor 14, that is, the curvature of the refractor 14 downwardly from the loci of mating between the reflector 12 and the reflector 14 toward lowermost portions of the globe member 10 as direction is referenced in FIG. 1 and considering also the angle of incidence of certain light rays incident on those prisms located near the juncture of the reflector 12 and the refractor 14, it is to be seen that the construction of the prisms 22 as splitter prisms or splitting prisms configured according to the invention is necessary for greatest light efficiency. The prisms 22 are chosen to be splitter prisms due to the fact that light incident upon said prisms 22 and which is to be most efficiently refracted thereby has an incidence angle of approximately 15° or such incidence angles are within a similar range of incidence angles. In order for light incident on the section of the refractor 14 having the splitter prisms 22 formed thereon, the prisms 22 are preferably formed with non-linear, that is, preferably curvilinear, surfaces over upper faces of said prisms 22 as can be seen clearly in FIGS. 3 and 4 inter alia. As particularly seen in FIGS. 3 and 4, a light ray 36 incident generally at 38 on anterior portions of the surface 34 is redirected such that the exiting ray 40 is not incident upon an immediately adjacent prism 22 due to internal reflection from the non-linear surface 34 of each one of said splitter prisms 22.

Figure 2:
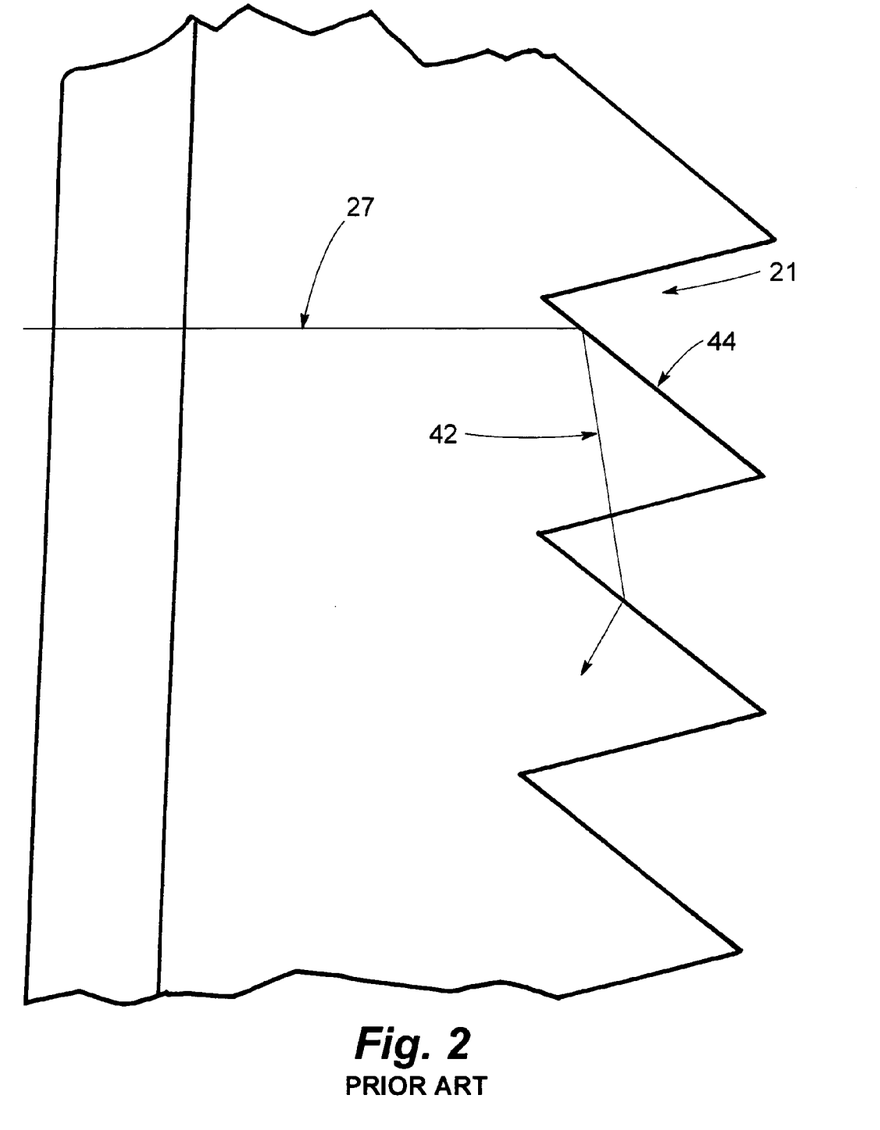
FIG. 2 is a schematic idealized representation illustrating a sectional view of a conventional prism having "straight" sides or "flat" surfaces.

As seen in FIG. 2, a light ray as seen at 27 is refracted into incidence onto adjacent conventional splitter prisms 21 when incident on at least anterior surfaces of any one of the conventional splitter prisms 22 as shown, the conventional prisms 21 having straight sides or flat surfaces 44. Refracted light ray 42 as shown in FIG. 2 is wasted.

Referring again to FIGS. 3 and 4, the "top" surface of each of the prisms 22, that is, the surface 34 of each of said prisms 22, is preferably curved in order to internally reflect the incident light ray 36 in a fashion such that the exiting ray 40 is not incident on the adjacent prism 22 directly below the prism 22 upon which the light ray 36 is initially incident.

Figure 5:
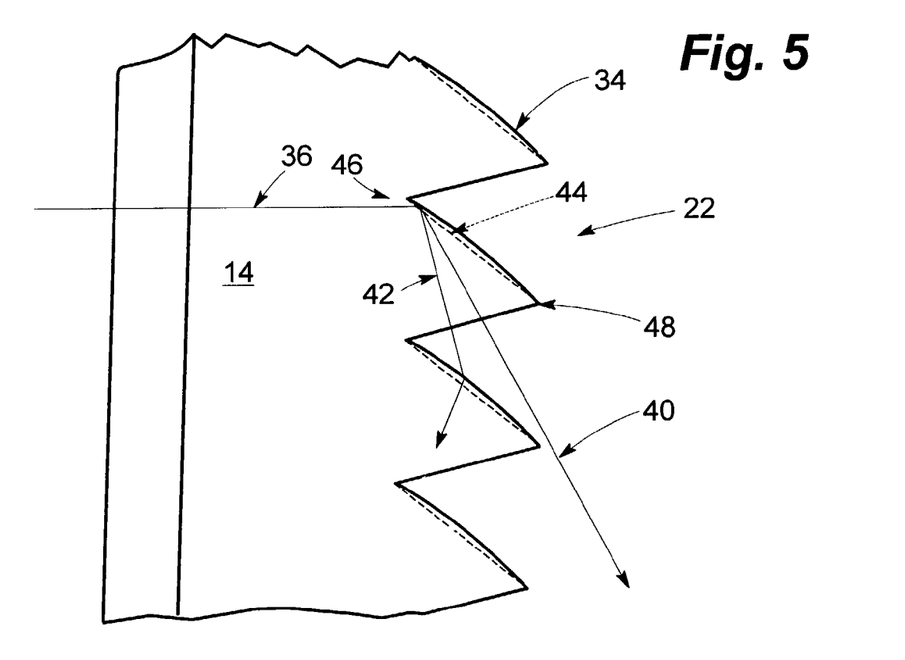
FIG. 5 is a schematic idealized representation comparing in overlaid relation the prisms of the invention as shown in FIG. 4 to prior art prisms such as are shown in FIG. 2.

As is seen at 42 in FIG. 5, the light ray 36 incident on a linear surface of any one of the prisms 22 if configured according to the structure of FIG. 2 (as shown in dotted lines in FIG. 5) would be reflected into incidence with the immediately adjacent prism 22 below said prism 22 and light would then be refracted essentially inwardly of the refractor 14 and would thus be lost. It is to be understood that light rays incident more distally of any one of the splitter prisms 22 would be more likely to be redirected externally of the refractor 14. In essence, light rays incident more distally of any one of the prisms 22 would more likely be redirected outwardly of the refractor 14 even if a surface corresponding to the surface 34 at a distal portion thereof is formed in a linear fashion. For this reason, more distal surface portions of any one of the splitter prisms 22 can be formed linearly as will be described in more detail hereinafter. The shaping of a surface of one of the prisms 22 other than as shown by the shape of the surface 34 can be accomplished according to other embodiments of the invention as will also be described in more detail hereinafter. It is further to be understood that lower surfaces of at least some of the prisms 22 are formed such as in the shape of the surface 34 on "upper" surfaces of said prisms 22 since light incident thereon, such as the light ray 36, if light is intended to be directed upwardly. In such situations where light needs to be directed upwardly, that surface lowermost of the prisms 22 would be shaped in order to efficiently redirect light upwardly of the globe member 10 as will be described in more detail hereinafter.

Referring once again to FIG. 5, the splitter prisms 22 are seen to be formed with the non-linear surfaces 34 referred to hereinabove, a representation of the prisms 22 being seen to have superimposed thereon a straight side or flat surface at 44 shown in dashed lines in order to differentiate clearly between a conventional prism as would be represented by the straight surface 44 and the prisms 22 of the invention having the non-linear surface 34 as previously discussed. As seen in the superimposed representations, the light ray 36 incident on the surfaces 34 and 44 at locations near valley 46 at the juncture of adjacent prisms 22 would be internally reflected in a different manner, the exiting ray 40 exiting the prism 22 having the nonlinear surface 34 being outwardly directed so as to miss the immediately adjacent prism 22 while the exiting ray 42 exiting a prism having a linear or straight-sided surface 44 at locations on said surface 44 in proximity to the valley 46 would be redirected as 42 to be incident on the immediately adjacent prism as aforesaid and therefore wasted or lost by being redirected either toward the interior of the optical structure or in a direction such that the ray 42 is not effectively and efficiently utilized for illumination purposes. It is to be noted that light rays incident on either of the surfaces 34 or 44 toward a distal end or apex 48 of one of the prisms 22 would typically be appropriately directed outwardly of the prisms 22 for effective utilization for illumination purposes.

Figure 7:
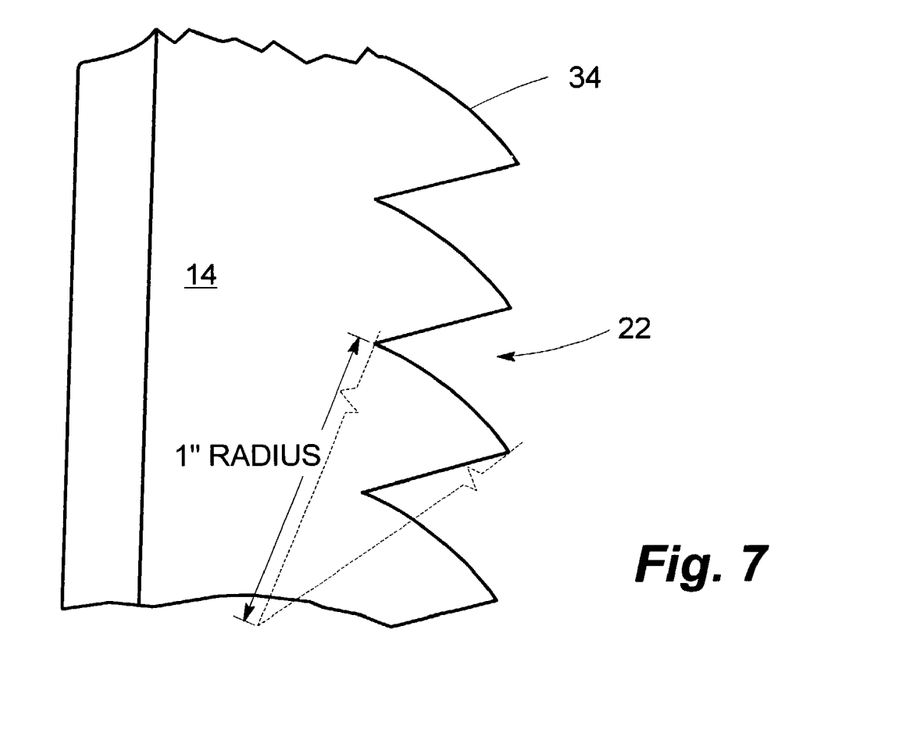
FIG. 7 is a schematic idealized representation illustrating prisms configured according to the invention of an arcuate curvature and of a particular radius.

Referring now to FIG. 7, one of the prisms 22 is shown in detail in order to illustrate typical dimensions. The effective dimensional length of the prism 22 is between 0.2 and 0.3 inch both for prior art straight-sided prisms and for the splitter prism 22, particular prism dimensions being subject to cosmetic considerations. It is possible to dimension the prism 22 in a range such as between 0.1 to 0.5 inch in practical applications. However, smaller prisms lead to a higher proportion of light leakage through the apices and valleys of the prisms. Prisms of a larger size produce a rougher appearance, the range of 0.2 to 0.3 inch being a compromise that provides effective function and desirable appearance. While the curvature of the nonlinear surface 34 can be taken to be a circular arc or other curvilinear shape, a suitable shape is taken to be a circular arc of one inch radius.

Figure 8:
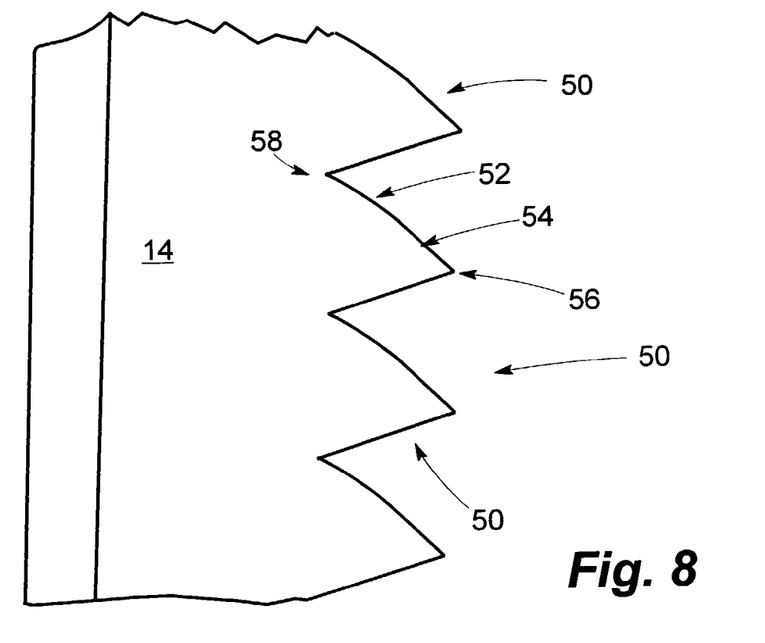
FIG. 8 is a detailed schematic idealized representation illustrating another embodiment of prisms configured according to the invention.

Referring now to FIG. 8, prisms such as prism 50 is seen to be configured according to another embodiment of the invention to be formed with an arcuate anterior surface at 52 and a straight-sided surface at 54 distally of the prism 50 toward apex 56 of said prism 50. In essence, the arcuate surface 52 is formed in proximity to valley 58 at the juncture of adjacent prisms 50 at anterior portions of prism surfaces while distal portions of said surfaces are essentially linear. The shaping shown in FIG. 8 functions appropriately in view of the fact that light rays incident on anterior surface portions of the prism 50 needs to be redirected in a manner according to the invention while light rays incident more distally of prism surfaces in proximity to the apex 56 are redirected without the necessity for shaping according to the invention. The respective lengths of the arcuate surface 52 and the straight surface 54 can preferably be taken to be equal.

Figure 9:
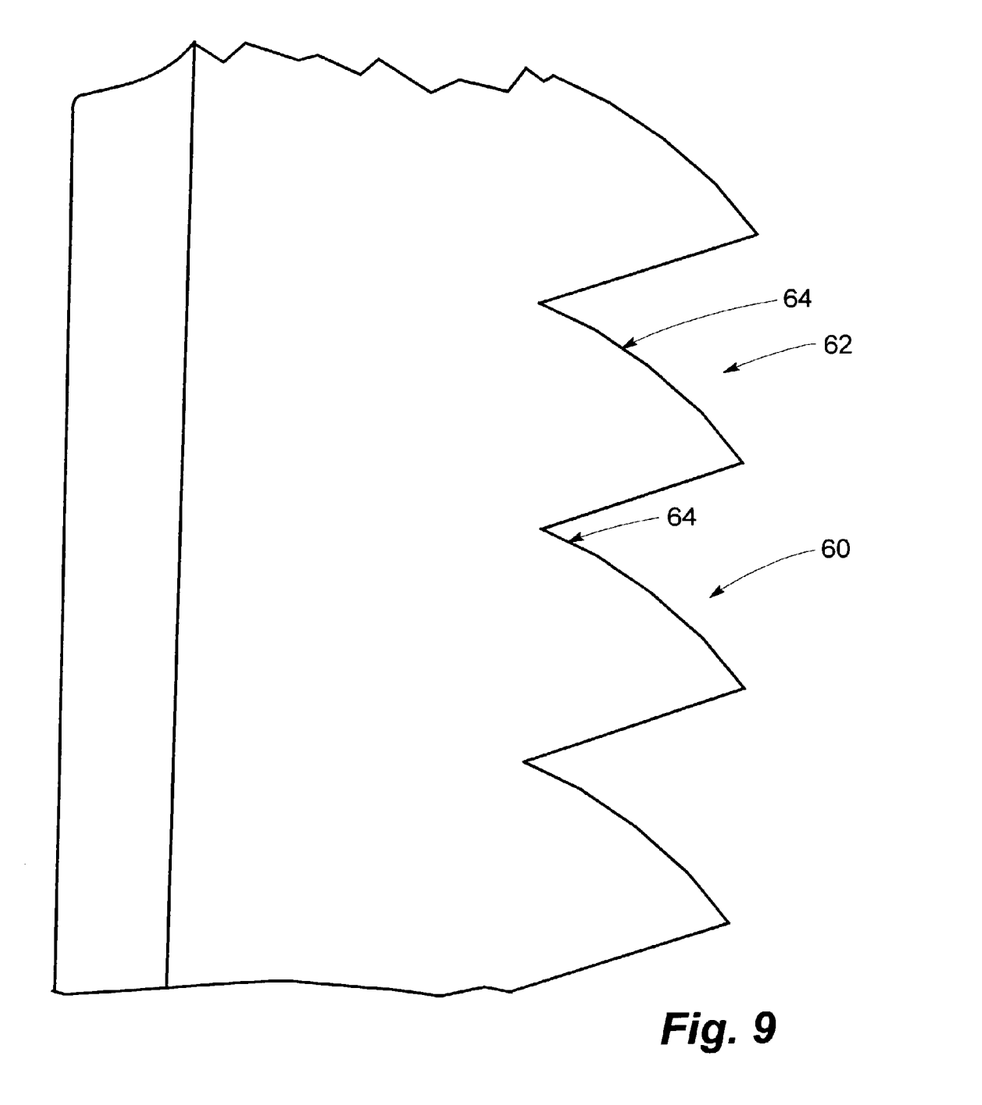
FIG. 9 is a detailed schematic idealized representation of prisms configured to yet another embodiment of the invention.
Figure 10:
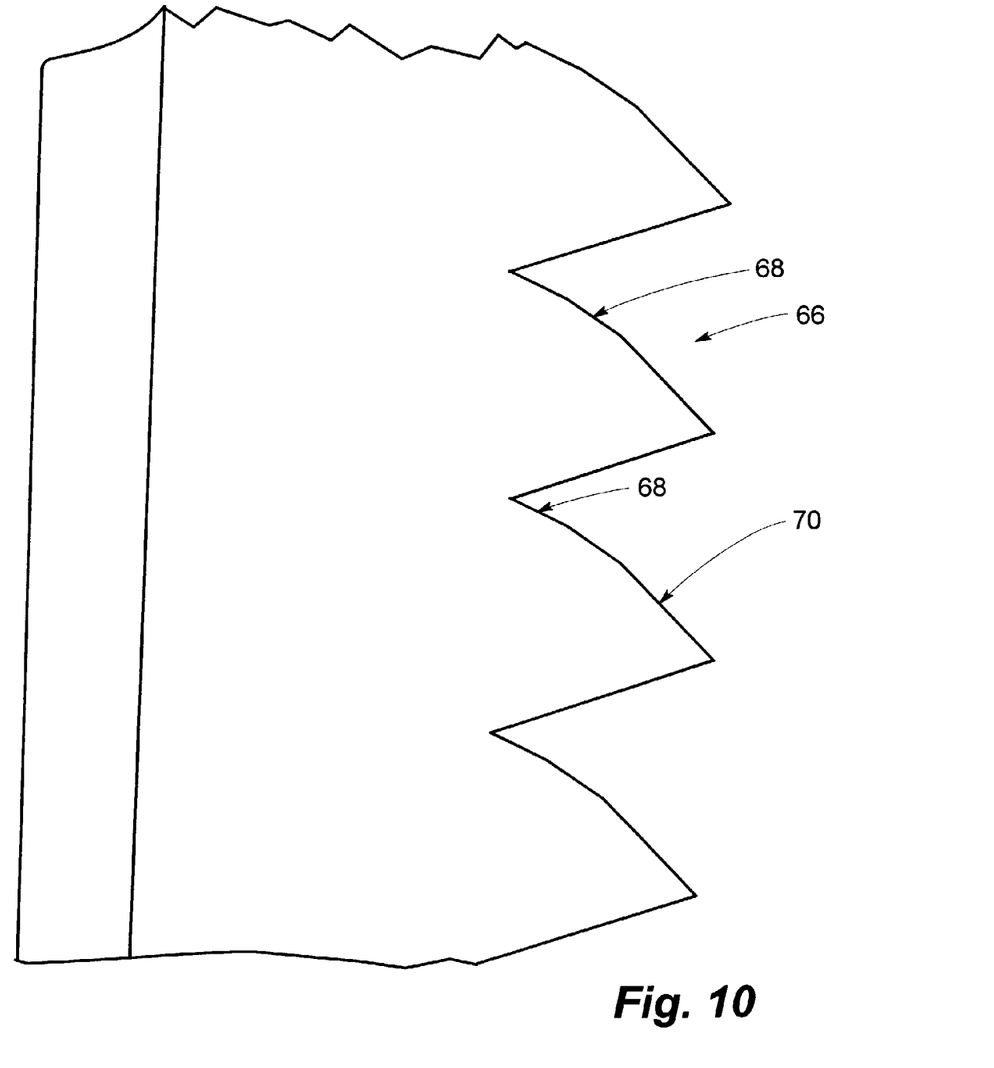
FIG. 10 is a detailed schematic idealized representation of prisms configured according to a further embodiment of the invention.

Referring now to FIG. 9, a prism 60 configured according to the invention is seen to be provided with a surface 62 that is segmented along its full length in a manner approximating a curve or arc, segments 64 forming the surface 62 being of the same or even differing lengthwise dimensions. In FIG. 10, a similar prism 66 is illustrated to be segmented anteriorly of the prism 66 at 68 but with a straight-sided surface at 70 distally of the prism 66.

Figure 11:
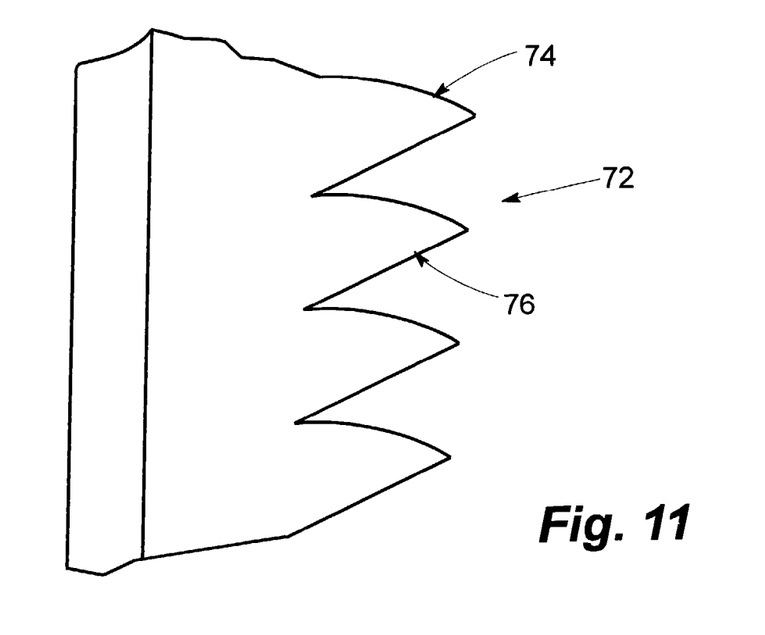
FIG. 11 is a detailed schematic idealized representation of prisms configured according to a still further embodiment of the invention.

Referring now to FIG. 11, a prism 72 configured according to a further embodiment of the invention is seen to be formed with a curved "upper" surface 74 and a straight-sided lower surface 76, the lower surface 76 being longer than the upper surface 74. The respective lengths of the surfaces 74 and 76 can vary depending on location of a light source such as the light source 16 within a globe member such as a globe member 10. In situations where the light source 16 is disposed at essentially the same elevation as the set of splitter prisms 22 as seen in FIG. 1 inter alia, the upper and lower surfaces of prisms configured according to the invention, as described above relative to the prisms 22, are similar in length. Disposition of the light source 16 at a different elevation causes the lengths of the surfaces 74 and 76 to diverge. As shown in FIG. 11, formation of the lower surface 76 to have a length greater than the length of the upper surface 74 is occasioned by a lowering of the light source 16 within the globe member 10 when compared to placement of the light source 16 within said member 10 as shown in FIG. 1.

Figure 12:
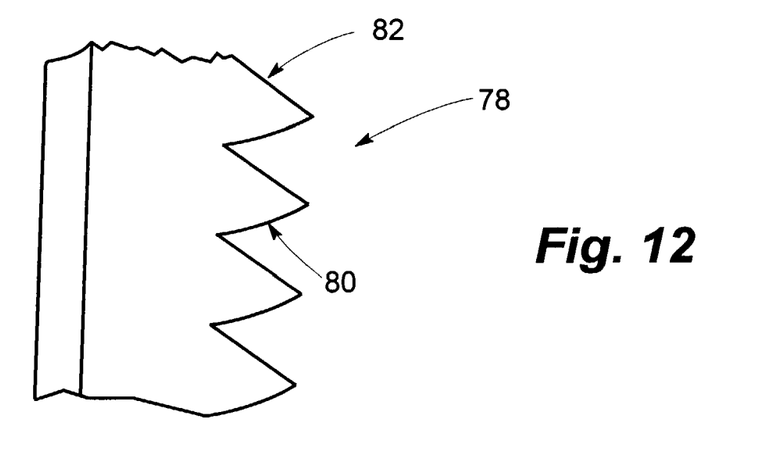
FIG. 12 is a detailed schematic idealized representation of prisms configured according to further teachings of the invention.

Referring now to FIG. 12, a prism 78 is configured according to a further embodiment of the invention by formation of lower surface 80 in a curved, arcuate or non-linear manner such as described hereinabove while upper surface 82 is straight-sided. The prism 78 so configured functions to improve uplight from a globe member such as a globe member 10 when a prism such as the prism 78 is formed with said member 10 as a component part thereof to function for desirable light redirection.

Figure 13:
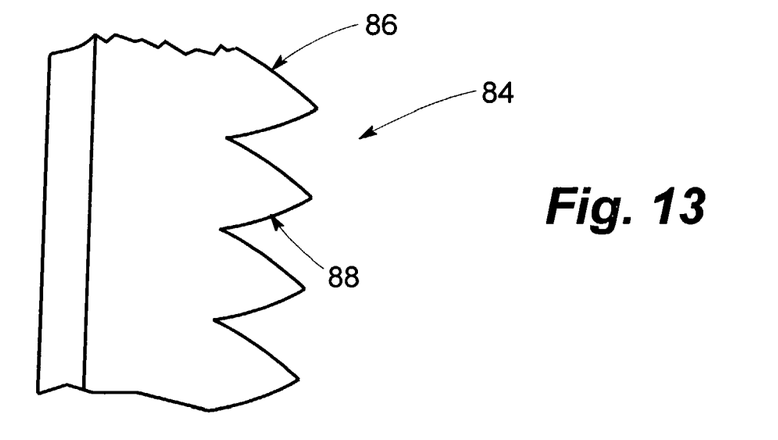
FIG. 13 is a detailed schematic idealized representation of prisms configured according to still further teachings of the invention.

As is seen in FIG. 13, a prism 84 is seen to have both upper and lower surfaces 86 and 88 respectively formed in a non-linear fashion according to any of the several teachings referred to hereinabove, the prism 84 therefor functioning to improve the efficiency of light redirection both downwardly and upwardly relative to a globe member oriented such as the globe member 10 is oriented in FIG. 1 as an example.

Figure 14:
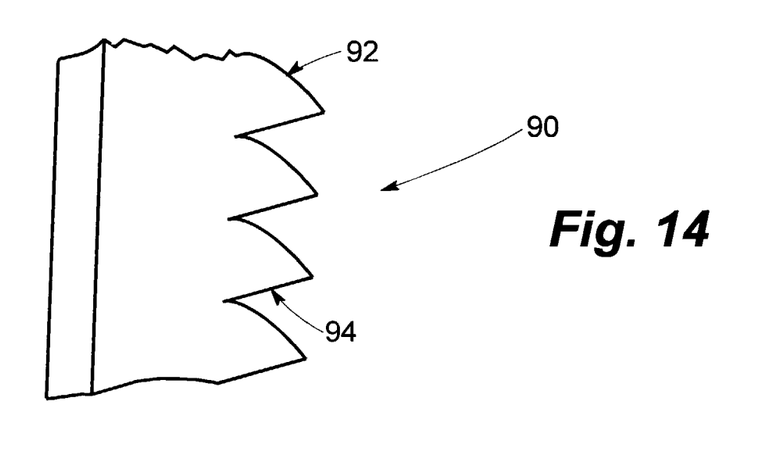
FIG. 14 is a detailed schematic idealized representation of prisms configured according to yet another embodiment of the invention; and, FIG. 15 is an idealized schematic representation of a portion of a reflector section of a luminaire having prisms configured according to an embodiment of the invention and illustrating light rays passing through said refractor section at different portions thereof.

Referring now to FIG. 14, a prism 90 configured according to yet another embodiment of the invention has an upper surface 92 formed in the shape of a curve that is other than a circular arc, the surface 92 being of substantially the same length as straight-sided lower surface 94. It is understood that the prism 90 could be variously configured with a non-circular arcuate portion configured in a manner similar to the configuration of those prisms referred to hereinabove as being shaped according to the teachings of the invention.

Figure 15:
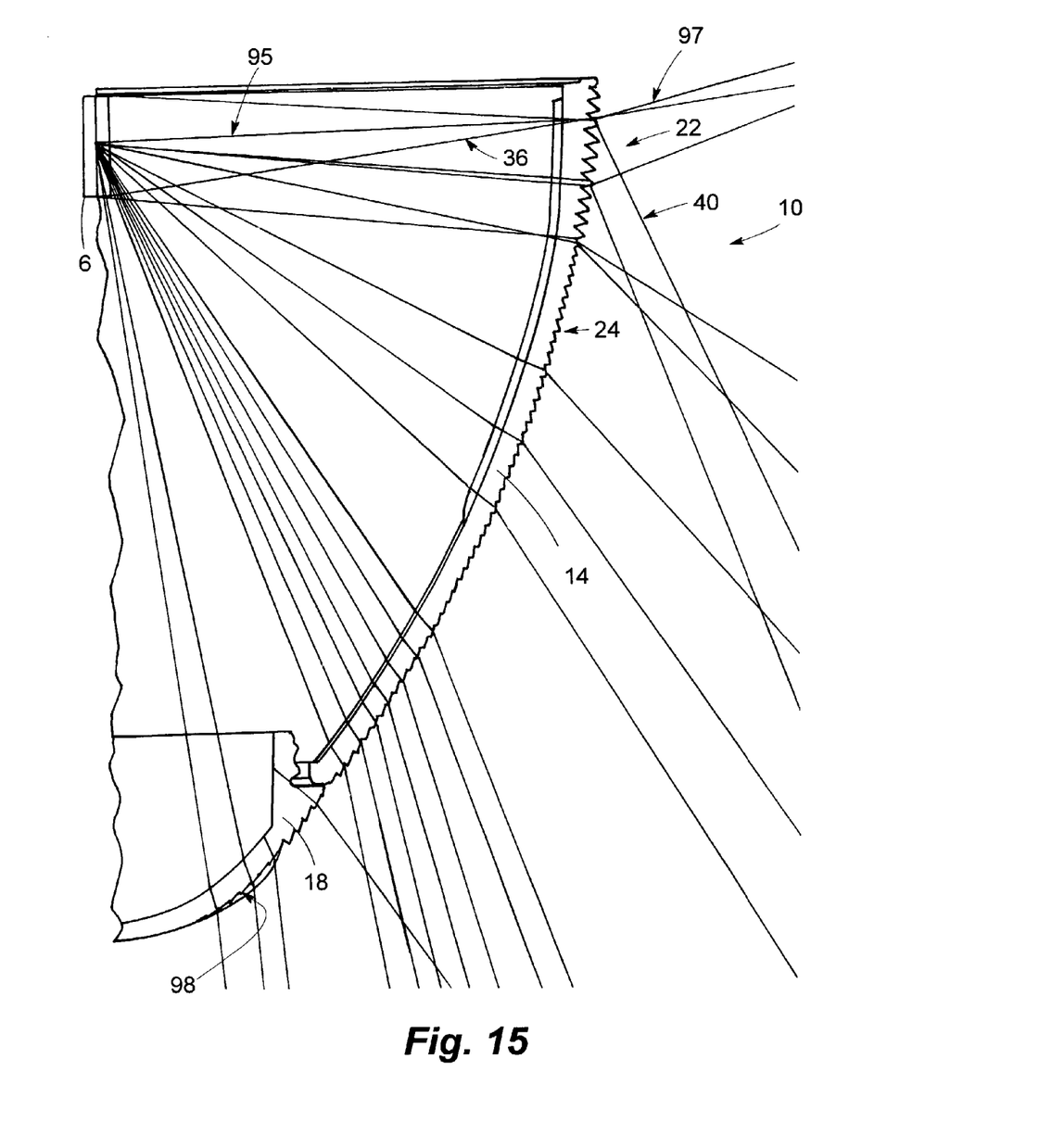

Referring now to FIG. 15, a portion of the refractor 14 is representationally seen in order to illustrate the paths of light rays passing through at least portions of the refractor 14. Light ray 95 incident on an upper portion of the refractor 14 and emanating from a central portion of the light source 16 at a high angle is redirected by the prism 22 upwardly of the globe member 10, thereby providing at least some degree of uplight. As noted above, light rays such as the light ray 36 are redirected downwardly and out of the globe member 10 by the agency of non-linear surfaces of the prisms 22 to produce the light ray 40. Light rays emanating from the light source 16 downwardly thereof pass through refractive prisms 98 formed on the door 18. Light rays emanating from the light source and incident on portions of the refractor 14 having the refractive prisms 24 thereon are refracted outwardly and downwardly of the globe member 10 to illuminate that space in the vicinity of the globe member 10.

While the invention has been particularly described as being useful on particular kinds of prisms, it is to be understood that other kinds of prisms could be configured according to the teachings of the invention without departing from the intended scope thereof. Still further, it is to be understood that prisms configured according to the inventions can be utilized in environments other than the luminaire environments particularly referred to herein without departing from the intended scope of the invention. Accordingly, it is to be understood that the invention can be embodied other than as explicitly described herein without departing from the scope of the invention, the inventive scope being provided by the definition of the appended claims.

What is claimed is:

1. In a luminaire for illumination of surfaces within an area within which the luminaire is disposed and having a light-transmissive member for controlling the direction of at least a portion of light emanating from the luminaire, the light-transmissive member having a wall and a multiplicity of prisms formed thereon, at least certain of the prisms being respectively adjacent and forming junctures between adjacent prisms, each prism having an apex defined by the intersection of elongate surfaces defining exteriorly oriented faces of each said prism, a light source disposed in opposed relation to said wall, the improvement comprising at least a portion of at least one face of at least certain of said prisms being non-linear in section, the non-linear portion of the at least one face of the prism being located in proximity to the valley between the prism and an adjacent prism, the non-linear portion of the face being a circular arc, apices of at least adjacent prisms being substantially disposed in alignment along an imaginary curve incongruent with an imaginary circular arc having a radius equal to the distance between a center of the light source and any one of the apices.

2. In the luminaire of claim 1 wherein the non-linear portion of the face is curved.

3. In the luminaire of claim 1 wherein the face is curved over the full length thereof.

4. In the luminaire of claim 1 wherein the face is curved in proximity to the valley between the prism and an adjacent prism and is linear in proximity to the apex of the prism.

5. In the luminaire of claim 1 wherein one of the faces is of a greater length than the other face.

6. In the luminaire of claim 1 wherein both of the faces have at least a portion thereof being non-linear.

7. In the luminaire of claim 1 wherein at least one of the prisms having a non-linear face portion is a refractive prism.

8. In the luminaire of claim 1 wherein at least a portion of the light-transmissive member is a refractor.

9. In the luminaire of claim 1 wherein the at least one of the prisms is a splitter prism.

10. In the luminaire of claim 1 wherein the light source is disposed substantially enclosed within confines defined at least in part by the light-transmissive member, the light source opposing the at least one of the prisms having a non-linear face portion at a similar level of the member within the luminaire.

11. In the luminaire of claim 10 wherein that portion of the light-transmissive member disposed in opposing relation to the light source has at least certain of said prisms formed thereon, at least certain prisms having the non-linear face portions, the portion of the light-transmissive member being shaped in a manner whereby at least a portion of the light passing exteriorly of the member from said prisms is not incident on adjacent prisms as would occur in the event that faces of said prisms were linear at loci of initial light incidence on inner surfaces of said prism faces.

12. In the luminaire of claim 1 wherein at least certain of said prisms having non-linear portions of faces thereof are disposed on the light-transmissive member at a portion of the member that is shaped in a manner whereby at least portions of the light passing exteriorly of the member from said prisms is not incident on adjacent prisms as would occur in the event that surfaces of said prisms were linear at loci of initial light incidence on inner surfaces of said prism faces.

13. In a luminaire for illumination of surfaces within an area within which the luminaire is disposed and having a light-transmissive member for controlling the direction of at least a portion of light emanating from the luminaire, the light-transmissive member having a multiplicity of prisms formed thereon, at least certain of the prisms being respectively adjacent and forming a valley at each juncture between adjacent prisms, the light emanating from a light source disposed in opposed relation to that portion of the light-transmissive member having the prisms formed thereon, each prism having an apex defined by the intersection of elongate surfaces defining exteriorly oriented portions of said prism, the improvement comprising at least a portion of at least one of the surfaces of at least certain of the prisms being non-linear in section, the non-linear portions of the at least one surface of each of said prisms being located in proximity to the valley between each prism and an adjacent prism, the non-linear portion of the at least one surface being a circular arc.

14. In the luminaire of claim 13 wherein the at least one surface is curved over the full length thereof.

15. In a luminaire for illumination of surfaces within an area within which the luminaire is disposed and having a light-transmissive member for controlling the direction of at least a portion of light emanating from the luminaire, the light-transmissive member having a multiplicity of prisms formed thereon, at least certain of the prisms being respectively adjacent and forming a valley at each juncture between adjacent prisms, the light emanating from a light source disposed in opposed relation to that portion of the light-transmissive member having said prisms formed thereon, each prism having an apex defined by the intersection of elongate surfaces defining exteriorly oriented portions of said prism, the improvement comprising at least a portion of at least one of the surfaces being non-linear in section, the surface being curved in proximity to the valley between the prism and an adjacent prism and being linear in proximity to the apex of the prism.

16. In a luminaire for illumination of surfaces within an area within which the luminaire is disposed and having a light-transmissive member for controlling the direction of at least a portion of light emanating from the luminaire, the light-transmissive member having a multiplicity of prisms thereon, at least certain of the prisms being respectively adjacent and forming a valley at each juncture between adjacent prisms, the light emanating from a light source disposed in opposed relation to that portion of the light-transmissive member having the prisms formed thereon, each prism having an apex defined by the intersection of elongate surfaces defining exteriorly oriented portions of each said prism, the improvement comprising at least a portion of at least one of the surfaces being non-linear in section, the non-linear portion of the surface being formed of a series of line segments.

17. In a luminaire for illumination of surfaces with an area within which the luminaire is disposed and having a light-transmissive body member and at least one light source disposed in opposed relation to a first surface of said body member, the improvement comprising prismatic means for controlling light produced by the at least one light source and being disposed on at least portions of a second surface of the body member, the first surface of the body member being disposed between the prismatic means and the light source, the prismatic means having faces with at least a portion of at least one face being non-linear in section, the prismatic means comprising adjacent prisms, each of the prisms having an apex defined by intersection of said faces, the non-linear portion of the face being a circular arc, apices of the prisms being substantially disposed in alignment along an imaginary curve incongruent with an imaginary circular arc having a radius equal to the distance between a center of at least one of said light sources and any one of the apices, light from the at least one of said light sources being incident on surfaces of said prismatic means and being directed outwardly of said second surface of the light-transmissive body member without being incident on any portion of the body member.

18. In the luminaire of claim 17 wherein the non-linear portion of the face of each of said prisms is anterior to the apex of each of the prisms.

19. In the luminaire of claim 17 wherein the non-linear portion of the face is anterior to the apex of the prism and that portion of the face in proximity to the apex of the prism is linear.

20. In the luminaire of claim 17 wherein the face is curved over the full length thereof.

21. In the luminaire of claim 17 wherein one of the faces is of a greater length than the other face.

22. In the luminaire of claim 17 wherein the prism is a splitter prism.

23. In the luminaire of claim 17 wherein the prism is a refractive prism.

24. In the luminaire of claim 17 wherein the prism is formed of a light-transmissive material and is located adjacent to at least one additional prismatic structure, light incident on the non-linear portion of the at least one face being directed by the prism to avoid incidence on an adjacent prismatic structure.

25. In the luminaire of claim 17 wherein each prism is adjacent to a prism on at least one side thereof, light incident on the non-linear portion of the at least one face being directed by the prism to avoid incidence on the adjacent prism.

26. In a luminaire for illumination of surfaces within an area within which the luminaire is disposed and having a light-transmissive body member and at least one light source disposed in opposed relation to a first surface of said body member, the improvement comprising prismatic means for controlling light produced by the light source and being disposed on at least portions of a second surface of the light-transmissive body member, the first surface of the body member being disposed between said second surface and the light source, the first surface thus being disposed between the prismatic means and the light source, light from the light source being incident on at least portions of said faces and being directed immediately outwardly of the light-transmissive body member without being incident on any portion of the light-transmissive body member, the prismatic means comprising adjacent prisms, each of the prisms having an apex formed by intersection of said faces of each said prism, at least one of the faces onto which light from the light source is incident having at least a portion thereof which is non-linear in section, the non-linear portion of the face being a circular arc.

27. A method for controlling light in a luminaire for illumination of surfaces within an area within which the luminaire is disposed and having a light-transmissive body member and a light source disposed in spaced relation to a first surface of said body member and opposing said first surface, a second surface of the body member having a multiplicity of prisms disposed thereon, at least portions of the prisms having apices defined by the intersection of elongate, externally oriented faces of said prisms, the first surface of the body member being disposed between the light source and the prisms, comprising the steps of:

shaping at least a portion of at least one of the faces of at least certain of the prisms in a non-linear conformation in section to direct light incident thereon outwardly of the light-transmissive body member to avoid incidence on at least one adjacent prism, the non-linear portion of the surface of each of the at least certain of the prisms is anterior to the apex of each said prism and is a circular arc;

disposing at least certain of the prisms on the second surface of the body member to substantially locate apices of said at least certain of the prisms in alignment along an imaginary curve incongruent with an imaginary circular arc having a radius equal to the distance between a center of the light source and any one of the apices; and, directing light from the light source toward said first surface of the body member and through said body member and in directions externally of the body member whereby light passing through the at least certain of the prisms is not redirected through the first surface of the body member.

28. The method of claim 27 wherein said surface of each of the prisms is curved over the full length thereof.

29. The method of claim 27 wherein at least certain of the prisms are refractive prisms.

30. The method of claim 27 and further comprising the step of aligning junctures between adjacent prisms substantially in alignment along a second imaginary curve substantially in congruent relation to said first-mentioned curve on which the apices of said adjacent prisms are disposed.

31. A method for controlling light in a luminaire for illumination of surfaces within an area within which the luminaire is disposed and having a light-transmissive member and a light source disposed in spaced relation to a first surface of said body member and opposing said first surface, a second surface of the body member having a multiplicity of prisms disposed thereon, the first surface of the body member being disposed between the light source and the prisms, comprising the steps of:

shaping at least a portion of a face of at least one of the prisms to produce a non-linear conformation in section for direction of light incident thereon outwardly of the light-transmissive body member to avoid incidence on at least one adjacent prism, the prism having an apex and the non-linear portion of the face of the prism being anterior to the apex of the prism, the non-linear portion being a circular arc; and, directing light from the light source onto the face of at least one of the prisms.

32. In a luminaire for illumination of surfaces within an area within which the luminaire is disposed and having a light-transmissive body member and at least one light source disposed in opposed relation to a first surface of said body member, the improvement comprising prismatic means for controlling light produced by the light source and being disposed on at least portions of a second surface of the light-transmissive body member, the first surface of the body member being disposed between said second surface and the light source, the first surface thus being disposed between the prismatic means and the light source, light from the light source being incident on said faces and being directed immediately outwardly of the light-transmissive body member without being incident on any portion of the light-transmissive body member, the prismatic means comprising adjacent prisms, each of the prisms having an apex formed by intersection of the faces, at least one of the faces onto which light from the light source is incident having at least a portion thereof which is non-linear in section, the non-linear portion of the face being formed of a series of line segments.

33. In a luminaire for illumination of surfaces within an area within which the luminaire is disposed and having a light-transmissive body member and at least one light source disposed in opposed relation to a first surface of said body member, the improvement comprising prismatic means for controlling light produced by the light source and being disposed on at least portions of a second surface of the light-transmissive body member, the first surface of the body member being disposed between said second surface and the light source, the first surface thus being disposed between the prismatic means and the light source, light from the light source being incident on said faces and being directed immediately outwardly of the light-transmissive body member without being incident on any portion of the light-transmissive body member, the prismatic means comprising adjacent prisms, each of the prisms having an apex formed by intersection of the faces, at least one of the faces onto which light from the light source is incident having at least a portion thereof which is non-linear in section, the non-linear portion of the at least one face being anterior to the apex of the prism and that portion of the at least one face in proximity to the apex of the prism being linear in section.

34. A method for controlling light in a luminaire for illumination of surfaces within an area within which the luminaire is disposed and having a light-transmissive body member and a light source disposed in spaced relation to surfaces of said body member, a multiplicity of prisms being disposed on the body member, at least certain of the prisms having apices defined by the intersection of elongate faces, comprising the steps of:

shaping at least a portion of at least one of the faces of at least certain of the prisms in a non-linear conformation in section to direct light incident thereon in a desired direction leading directly or indirectly externally of the luminaire;

locating apices of said at least certain of the prisms in substantial alignment along an imaginary curve incongruent with an imaginary circular arc having a radius equal to the distance between a center of the light source and any one of the apices;

directing light from the light source through the body member and incident on faces of at least one of the prisms; and, shaping the non-linear portion of each of said prisms as a series of line segments.

35. The method of claim 34 wherein the prisms are disposed on an outer surface of the body member.

36. The method of claim 34 wherein a juncture exists between adjacent prisms at intersections of respective faces of said prisms, the method further comprising locating the non-linear portion of the at least one face of each of the prisms in proximity to said junctures.

37. The method of claim 36 and further comprising the step of shaping at least one face of at least certain of said prisms in a non-linear shape in proximity to at least one juncture between one of the prisms and an adjacent prism and in a linear shape in proximity to the apex of said one of the prisms.

38. The method of claim 34 and further comprising shaping both of the faces of said prisms with a non-linear portion.

39. In a luminaire for illumination of surfaces within an area within which the luminaire is disposed and having a light-transmissive body member and at least one light source disposed in opposed relation to a first surface of said body member, the improvement comprising prismatic means for controlling light produced by the light source and being disposed on at least portions of a second surface of the light-transmissive body member, the first surface of the body member being disposed between said second surface and the light surface, light from the light source being incident on at least portions of said faces and being directed immediately outwardly of the light-transmissive body member without being incident on any portion of the light-transmissive body member, the prismatic means comprising adjacent prisms, each of the prisms having an apex formed by intersection of said faces of each said prism, said faces each having at least portions thereof which are non-linear in section.

40. In a luminaire for illumination of surfaces within an area within which the luminaire is disposed and having a light-transmissive member for controlling the direction of at least a portion of light emanating from the luminaire, the light-transmissive member having a wall and a multiplicity of prisms formed thereon, at least certain of the prisms being respectively adjacent and forming junctures between adjacent prisms, each prism having an apex defined by the intersection of elongate surfaces defining exteriorly oriented faces of each said prism, a light source disposed in opposed relation to said wall, the improvement comprising at least a portion of at least one face of at least certain of said prisms being non-linear in section, the non-linear portion of the face being formed of a series of line segments, apices of at least adjacent prisms being substantially disposed in alignment along an imaginary curve incongruent with an imaginary circular arc having a radius equal to the distance between a center of the light source and any one of the apices.

41. In a luminaire for illumination of surfaces with an area within which the luminaire is disposed and having a light-transmissive body member and at least one light source disposed in opposed relation to a first surface of said body member, the improvement comprising prismatic means for controlling light produced by the at least one light source and being disposed on at least portions of a second surface of the body member, the first surface of the body member being disposed between the prismatic means and the light source, the prismatic means having faces with at least a portion of at least one face being non-linear in section, the prismatic means comprising adjacent prisms, each of the prisms having an apex defined by intersection of said faces, the non-linear portion of the face being formed of a series of line segments, apices of the prisms being substantially disposed in alignment along an imaginary curve incongruent with an imaginary circular arc having a radius equal to the distance between a center of at least one of said light sources and any one of the apices, light from the at least one of said light sources being incident on surfaces of said prismatic means and being directed outwardly of said second surface of the light-transmissive body member without being incident on any portion of the body member.

42. In a luminaire for illumination of surfaces with an area within which the luminaire is disposed and having a light-transmissive body member and at least one light source disposed in opposed relation to a first surface of said body member, the improvement comprising prismatic means for controlling light produced by the at least one light source and being disposed on at least portions of a second surface of the body member, the first surface of the body member being disposed between the prismatic means and the light source, the prismatic means having faces with at least a portion of at least one face being non-linear in section, the prismatic means comprising adjacent prisms, each of the prisms having an apex defined by intersection of said faces, both of the faces having at least a portion thereof which is non-linear, apices of the prisms being substantially disposed in alignment along an imaginary curve incongruent with an imaginary circular arc having a radius equal to the distance between a center of at least one of said light sources and any one of the apices, light from the at least one of said light sources being incident on surfaces of said prismatic means and being directed outwardly of said second surface of the light-transmissive body member without being incident on any portion of the body member.

* * * * *